United States Patent [19]
Benson

[11] 3,713,349
[45] Jan. 30, 1973

[54] PRELOADED INCREMENTAL FEED DEVICE

[75] Inventor: Carl F. Benson, Torrington, Conn.

[73] Assignee: The Torrington Company, Torrington, Conn.

[22] Filed: July 30, 1970

[21] Appl. No.: 59,759

[52] U.S. Cl. .......................... 74/409, 74/441, 90/22
[51] Int. Cl. ........................... F16h 55/18, B23c 9/00
[58] Field of Search ......... 90/89.15, 22; 74/441, 409, 74/424.8 A

[56] References Cited

UNITED STATES PATENTS

| | | | |
|---|---|---|---|
| 2,978,920 | 4/1961 | Sears et al. | 74/441 |
| 3,063,203 | 11/1962 | Busey et al. | 74/409 X |
| 2,206,479 | 7/1940 | Jereczek | 90/22 |
| 2,375,074 | 5/1945 | Carlson | 90/22 |
| 2,916,931 | 12/1949 | Cunningham | 74/441 |
| 2,983,159 | 5/1961 | Zeigkowsky et al. | 74/424.8 |
| 3,119,307 | 1/1964 | Opferkuch | 74/441 X |

Primary Examiner—Leonard H. Gerin
Attorney—Diller, Brown, Damik & Holt

[57] ABSTRACT

The device provides very small increments of linear motion, such as are required in adjusting the elements of machine tools for size control. The device utilizes two ball screws secured to a movable machine tool element, with associated ball nuts carried by the screws, the ball nuts being preloaded against each other through a gear train or like driving means. Two or three ball screws may be utilized, with one or more screws loaded in tension, and one or more loaded in compression. The device is thus completely preloaded to eliminate backlash normally attendent to reversal of direction of the linearly movable machine element. The drive means comprise a shaft having a disk mounted thereon, which is manually rotatable, or which may be moved through a predetermined arc by engaging an edge of the disk with a cylinder actuated plunger, the plunger being carried by a pivotally movable drive lever which is provided with movement from a drive cylinder at one end, and which has adjustable stops for limiting the pivotal movement of the drive shaft. The pivotal movement of the drive shaft undergoes a double reduction in the device, resulting in increments of linear movement less than ten millionth of an inch with zero backlash.

31 Claims, 10 Drawing Figures

INVENTOR
CARL F. BENSON

INVENTOR
CARL F. BENSON

BY Mason, Porter, Diller & Brown
ATTORNEYS

INVENTOR
CARL F. BENSON

PRELOADED INCREMENTAL FEED DEVICE

This invention is directed to feed devices, and more particularly to an incremental feed device for attachment to a linearly movable machine element, which may be preloaded, partially in tension and partially in compression, to provide extremely small increments of either forward or reverse linear movement, without backlash.

Feed devices known in the prior art generally utilize a single screw and ball nut arrangement, wherein the ball nut is preloaded within itself against the screw. These devices are generally effective for eliminating backlash between the screw and nut alone, but are ineffective for eliminating backlash from the entire drive system. Also, prior art devices which are adapted for incremental feed in either a forward or a reverse direction generally require a certain amount of "lost motion" between the driving element and the driven element, immediately following a reversal of direction of motion, to account for assembly tolerances and the like, regardless of the precision with which the driving elements may be machined.

The present invention seeks to obviate the above and other undesirable features of the prior art, in providing a feed device wherein a driving member is connected to a linearly movable member by connection members, the connection members being oppositely preloaded such that any small increment of movement of the driving member is reflected in a linear movement of the machine member, without regard to prior direction of machine member movement, and wherein the backlash or "play," between the various components which comprise the connection members between the drive member and the movable member is zero.

Accordingly, it is a primary object of this invention to provide a feed device for driving a member, wherein drive means are provided with connecting means between the drive means and the member to be driven, the connecting means being adapted for eliminating backlash irrespective of the direction of drive.

It is another object of this invention to provide a feed device comprising drive means and connection members, whereby a member which is desired to be precisely fed may be connected to the connection members, and the connection members may be oppositely preloaded, one in tension, and another in compression.

It is another object of this invention to accomplish the above object, wherein the connection members each include a ball screw and a ball nut device, each ball nut being provided on its outer surface with drive teeth for engagement by the drive means.

It is another object of this invention to provide a backlash-free anti-friction motion reducing means whereby predetermined desirable increments of feed may be obtained by a predetermined arcuate displacement of a drive means.

It is yet another object of this invention to accomplish the above object, wherein the arcuate displacement of the drive means may be pre-set between stops, the arcuate displacement being independent of the motive force which provides the arcuate displacement.

It is a further object of this invention to accomplish all of the above objects, and others, wherein the incremental feed device is adapted for providing a transverse feed for a machine tool, such as a grinding machine or the like.

With the above and other objects in view that will hereinafter appear, the nature of the invention will be more clearly understood by reference to the following detailed description, the appended claims and the several views illustrated in the accompanying drawings:

IN THE DRAWINGS

Figure 8:
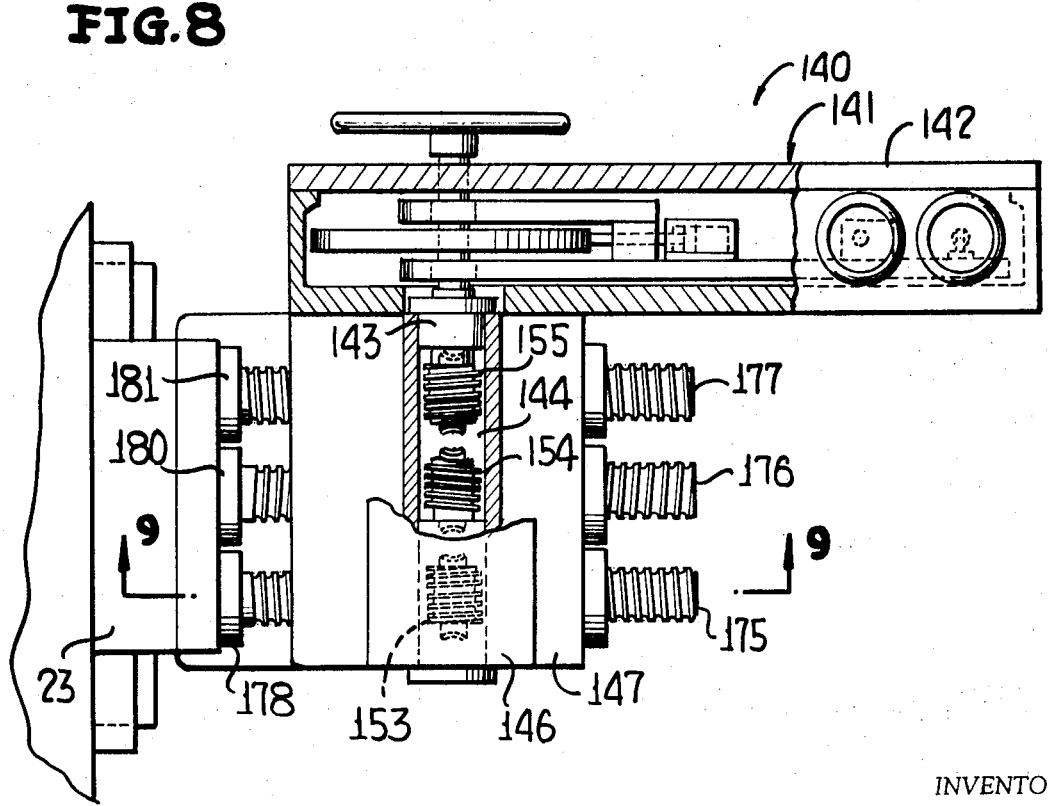

FIG. 8 is a fragmentary top plan view, with portions thereof being illustrated in section for clarity, of a preloaded incremental feed device of this invention, wherein three ball screws are provided, one of which is adapted to be preloaded opposite relative to the other two, and wherein the three ball screws are provided with a common drive shaft, with the shaft drive means being carried on one side of the device.

Figure 9:
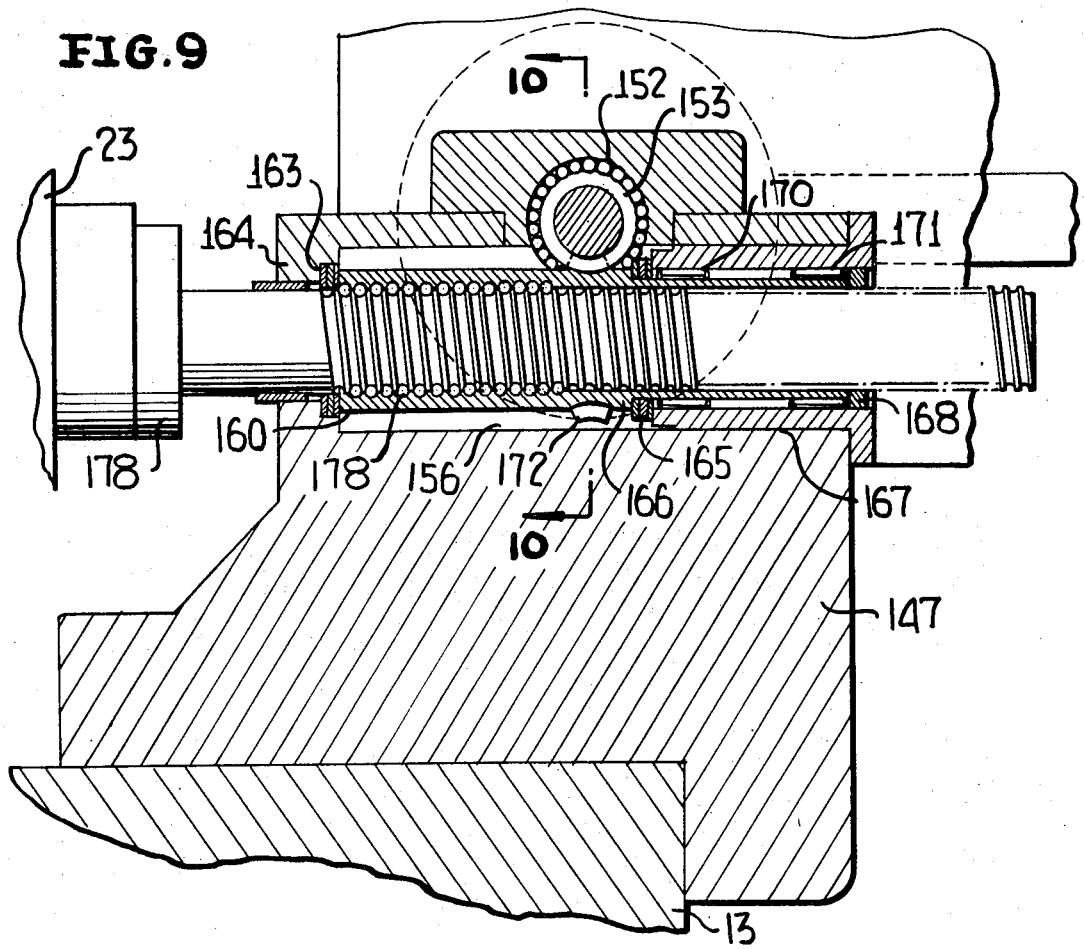

FIG. 9 is an enlarged vertical sectional view of the device of FIG. 8, taken generally along the line 9—9 of FIG. 8, and wherein the interconnection of the shaft-like drive means and a ball nut, for driving a ball screw therethrough is best illustrated.

Figure 10:
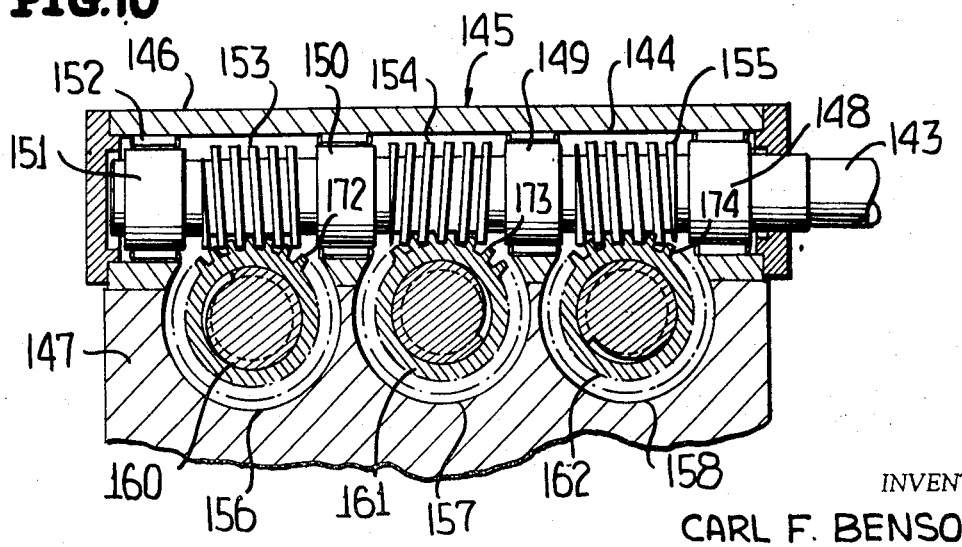

FIG. 10 is an enlarged vertical sectional view of a portion of the assembly illustrated in FIG. 9, taken generally along the line 10—10 of FIG. 9, further illustrating the attachment of the shaft-like drive means to each of the three driven ball nuts.

Figure 1:
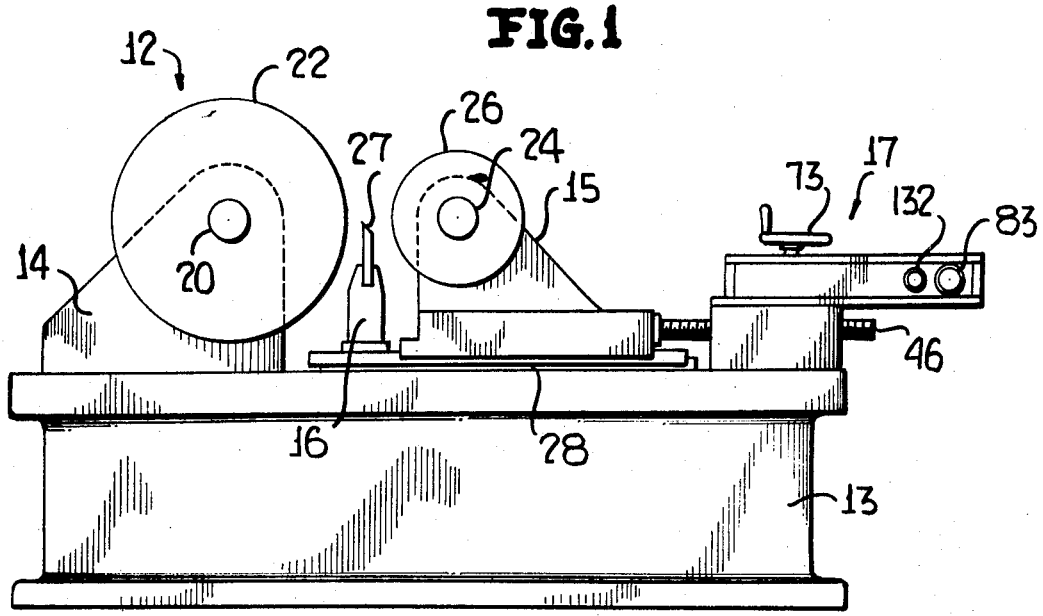
FIG. 1 is a front elevational view of a center-less grinder embodying the preloaded incremental feed device of this invention, secured to the regulating wheel assembly thereof, for transverse movement of the wheel.

Referring now to the drawings in detail, reference is first made to FIG. 1, wherein there is illustrated a machine tool 12 of the centerless grinder type. The machine tool 12 comprises a machine base 13, a stationary grinding wheel assembly 14, a regulating wheel assembly 15, an upstanding support 16 and the incremental feed device 17 of this invention, mounted on the machine base 13.

The grinding wheel assembly 14 includes a cast housing 18, in which is mounted a grinding wheel shaft 20, having drive sheaves 21 mounted on one end, and a grinding wheel 22 carried by the other end of the shaft 20.

The regulating wheel assembly comprises a cast housing 23, in which is rotatably carried a regulating wheel shaft 24, having drive sheaves 25 mounted on one end, and a regulating wheel 26 mounted on an opposite end.

The support 16 includes an upstanding supporting member 27, upon which an article to be ground (not shown) is supported.

Figure 2:
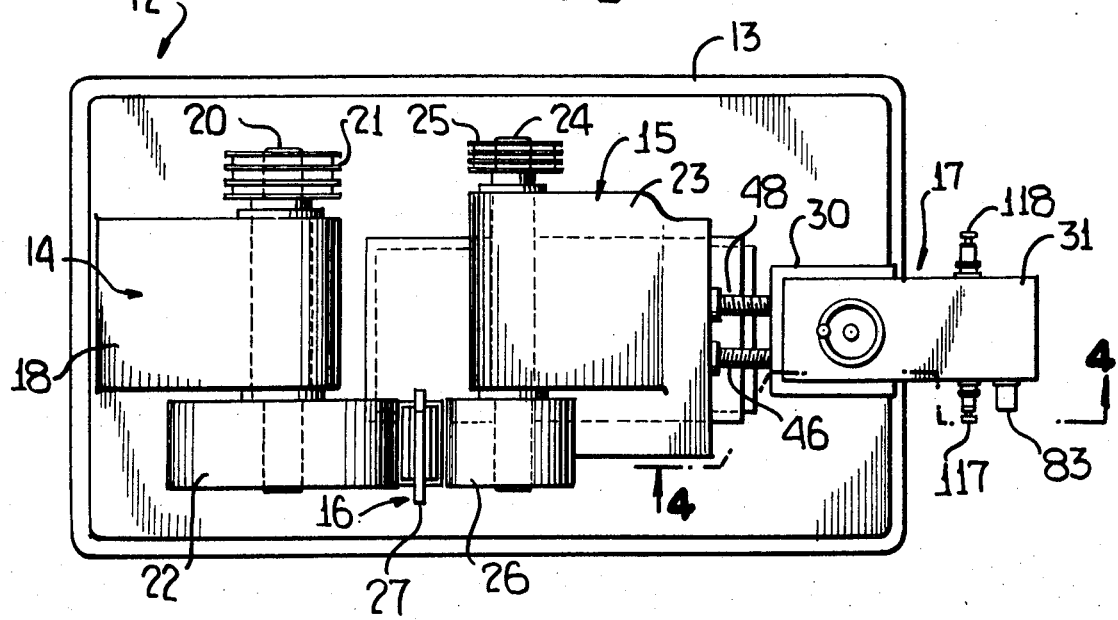
FIG. 2 is a top plan view of the machine of FIG. 1, wherein the general disposition of the feed device relative to the machine regulating wheel assembly is illustrated.

The regulating wheel assembly 15 is adapted for transverse movement toward and away from the grinding wheel assembly 14, as viewed in FIG. 2, the assembly 15 being carried on the machine base 13 by a suitable slide arrangement 28, illustrated in FIG. 1.

The incremental feed device 17 includes a ball screw housing 30, mounted on the machine base 13, and an input drive portion housing 31, mounted on the housing 30.

Figure 4:
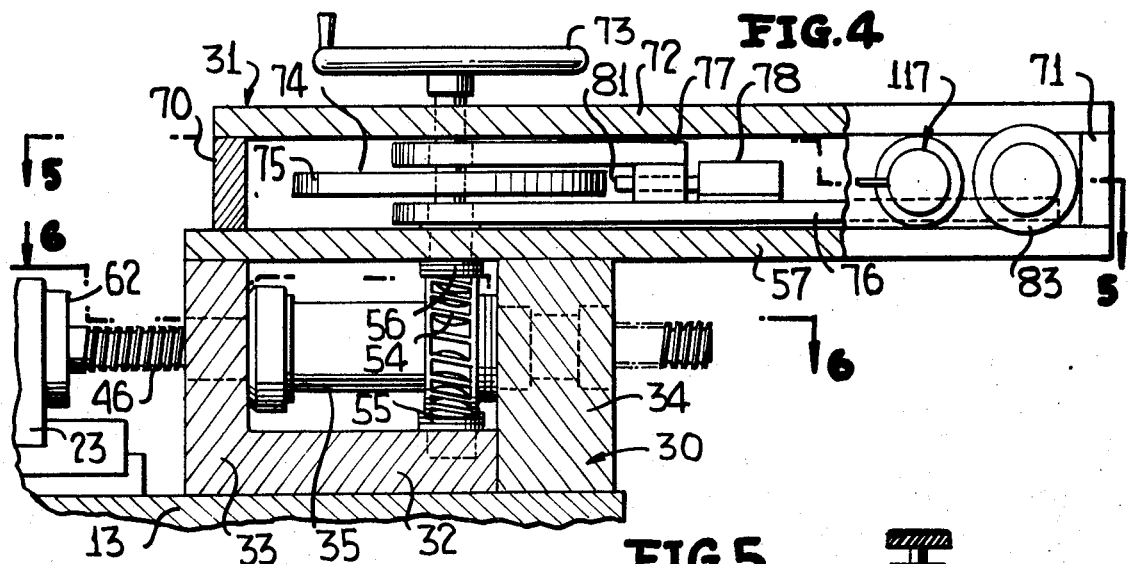
FIG. 4 is an enlarged fragmentary elevational view of the feed device of this invention, taken generally along the line 4—4 of FIG. 2, and wherein the means for rotating the drive means of the feed device is clearly illustrated.

With reference to FIG. 4, the ball screw housing 30 includes a base portion 32, a forward upstanding wall portion 33, and a rearward upstanding wall portion 34. A pair of ball nuts 35 and 36 are constrained between the front and rear wall portions 33 and 34 respectively. Forward thrust bearings 37 and 38, and rearward thrust bearings 40 and 41 are disposed at opposite ends of the ball nuts 35 and 36, to facilitate freedom of rotation of the ball nuts 35 and 36 relative to the housing wall portions 33 and 34.

Figure 7:
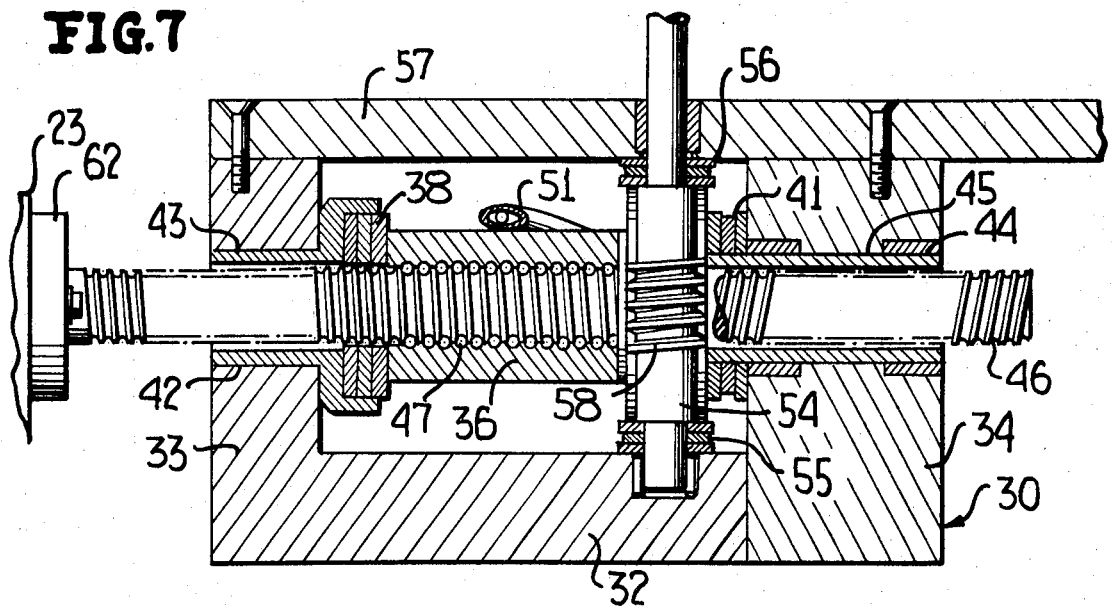
FIG. 7 is an enlarged sectional view through a portion of the device of this invention, taken generally along the line 7—7 of FIG. 6, and wherein the construction of the ball screw and ball nut is best illustrated.

With reference to FIG. 7, it is seen that the forward wall portion 33 is provided with a bore 42 in alignment with each ball nut 35 and 36, through which an associated thrust bearing carrier sleeve 43 is inserted and carried thereby. Similarly, a carrier sleeve 44 is disposed within a bore 45 of the wall portion 34 aligned with each of the ball nuts 35 and 36, to carry the opposite end of the respective ball nut. The ball nuts 35 and 36 are thus freely rotatable within the housing 30, subject to limitations imposed by a drive means for the ball nuts 35, 36, later to be described.

The ball nut 35 is provided with a ball screw 46 extending therethrough, and supported therein by antifriction ball elements 47. Similarly, the ball nut 36 is provided with a ball screw 48 extending therethrough and supported by ball elements 47. The ball screws 46 and 48 are thus freely rotatable within the ball nuts 35 and 36, respectively, and ball return passageways 50 and 51 are provided for the respective ball nuts 35 and 36, to provide a continuous return passageway for the rolling elements 47 from one end of each of the ball nuts 35 and 36, to their other ends. It is to be noted that the longitudinal motion provided by each of the ball screws 46 and 48, when driven by rotation of the ball nuts 35 and 36, respectively, is a reduced motion, thereby providing an efficient motion reduction between each of the ball nuts and ball screws. The ball screws 46 and 48 are of opposite hand drive, that is, one of left hand thread and the other of right hand thread, for a purpose later to be described.

Figure 6:
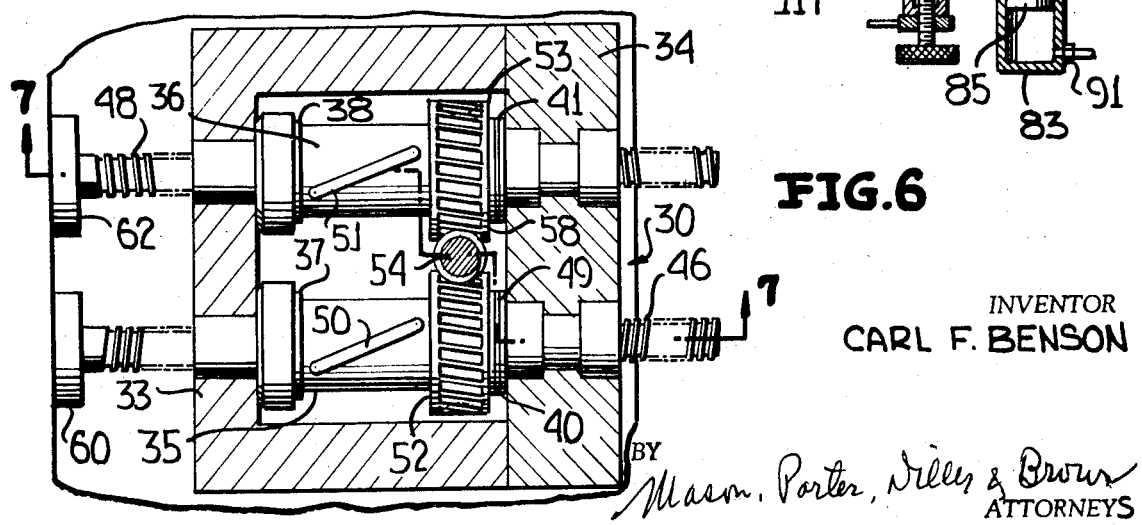
FIG. 6 is an enlarged fragmentary sectional view taken generally along the line 6—6 of FIG. 4, and wherein the worm gear type driving means between the shaft-like drive member and the ball nuts, for movement of the ball screws therethrough, is clearly illustrated.

With reference to FIG. 6, the ball nut 35 is provided with a worm gear 52, mounted thereon and carried for rotation therewith. Similarly, a worm gear 53 is provided on the ball nut 36. A shaft-like drive means 54 is provided within the housing 30, disposed between the worm gears 52 and 53 of the ball nuts 35 and 36, respectively, a lower end of the shaft-like drive means 54 being carried within a thrust bearing 55 which is mounted within the base member 32 of the housing 30, as illustrated in FIG. 4. The shaft-like drive means is provided with a thrust bearing 58 secured within an upper wall 57 of the housing 30, extending between the upstanding wall portions 33 and 34, the wall 57 also comprising a lower wall of the housing 31. Thus, the shaft-like drive means 54 is rotatably carried within the housing 30 by the bearings 55 and 56. The drive shaft 54 includes a worm 58 on its outer surface, in driving contact with the worm gears 52 and 53, for driving the ball nuts 35 and 36 in opposite rotational directions, as viewed axially, or from the right end of the illustration of FIG. 6.

Figure 3:
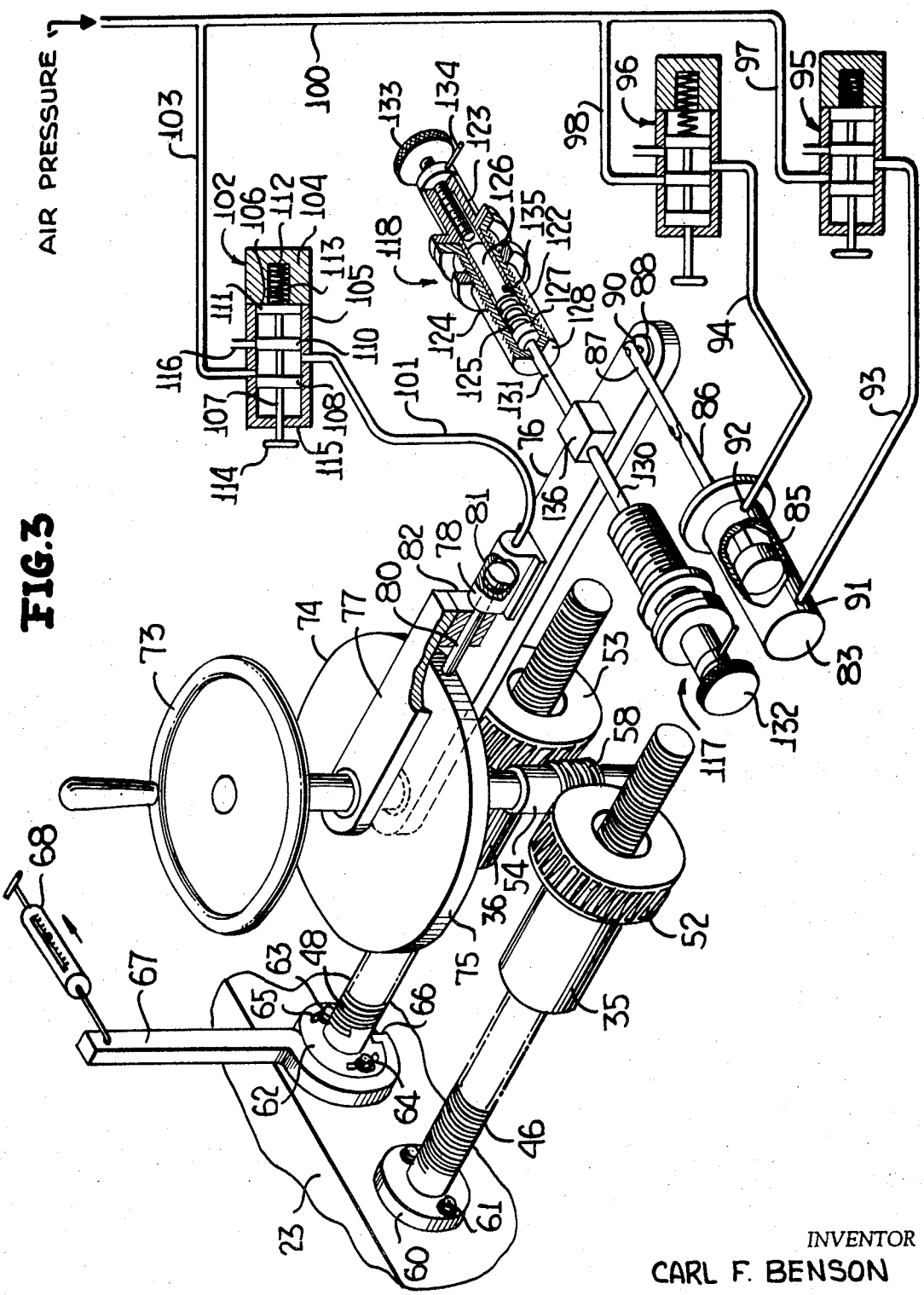
FIG. 3 is an enlarged perspective view of various of the operative components of the feed device, illustrated in their assembled condition, and wherein a means is illustrated for adjusting the opposite preload of the connection members of the feed device, and wherein a pneumatic cylinder system for providing motive force for operating the device is schematically illustrated.

With particular reference to FIG. 3, it is seen that the ball screw 46 is provided with a flange 60 at one end thereof, secured by means of cap screws 61 to the movable regulating wheel housing 23. The ball screw 48 is provided with a flange 62 also secured to the housing 23 by cap screws 63, but the flange 62 is provided with arcuate slotted holes 64 and 65 to permit a limited degree of rotational movement of the flange 62. The flange 62 is also provided with a notch 66, in which a spanner wrench may be inserted, for rotating the flange 62 until a predetermined torque is reached, as measured by a gauge 68, in which position of the spanner wrench 67 and flange 62 the cap screws 63 are tightened, locking the flange 62 in position, and thereby placing a predetermined pre-load torque into the system, which is effective to place the ball screw 48 and consequently the ball nut 36 in compression, this compressive force being transmitted through the drive shaft 54 to the ball nut 35 and ball screw 46, thereby placing the ball nut 35 and the ball screw 46 in tension. It is readily seen that the pre-loaded torque in the ball screw 48, and consequently in the ball screw 46 may be substantially appreciable in value, the desired magnitude being dependent upon the size of the force needed to move the machine element 15. If desired, the pre-load may be several times the force necessary to move the machine element 15. Thus, each connection means, one comprising the ball screw 46 and ball nut 35, and the other comprising the ball screw 48 and ball nut 36, provides a portion of the path of pre-load force distribution between the drive shaft 54 and the movable member 23. The applied pre-load force will remain in the system as the ball nuts 35 and 36 are rotated, because both of the ball nuts are rotated equal amounts as the drive worm 58 is rotated, thereby driving both of the ball screws 46 and 48 an equal distance in the same direction. Because of the opposite pre-load of each of the ball screw and ball nut connection means, a driving motion from the shaft 54 will immediately result in a driving motion of the movable member 23, without backlash, even immediately after reversal of direction of drive of the shaft 54.

With reference to FIG. 4, it is seen that the motion input housing or drive shaft actuator housing 31 includes the previously mentioned base member 57, forward and rearward upstanding wall members 70 and 71, and an uppermost horizontal wall member 72. The thrust bearing 56 which carries the drive shaft 54 is mounted within the lower housing member 57, and the shaft 54 extends upwardly through the housing member 57, and through the uppermost housing member 72, wherein a hand wheel 73 is secured to the shaft 54, the hand wheel 73 being generally used to over-ride the incremental feed actuation system at any time for rapid rough positioning of the movable machine member 23.

A drive disk 74 is mounted on and fixedly carried by the drive shaft 54, for rotation therewith. The drive disk 74 includes a generally vertical peripheral surface 75, of a desired coarseness, to facilitate frictional drive thereof. A drive lever 76 is pivotally carried about the upper extension of the drive shaft 54, below the disk 74, for freedom of movement about the shaft 54. A support lever 77 is similarly rotatably carried for freedom of rotation about the upper extension of the drive shaft 54, between the drive disk 75 and the upper housing member 72. A pnematic cylinder 78 is mounted on the drive lever 76 for movement therewith. The cylinder 78 carries a longitudinally movable plunger 80 driven by air pressure within the cylinder 78 operative against a piston 81 attached to the plunger 80 for driving the plunger 80 into contact against the surface 75 of the disk member 74, whereby a forward end surface 81 of the plunger 80 frictionally engages the surface 75, under sufficient axial pressure from air within the cylinder 78 to drive the drive disk 74 upon arcuate movement of the drive lever 76. A guide block 82 is mounted on the drive lever 76, between the lever 76 and the support lever 77, forwardly of the cylinder 78, to guide the longitudinal movement of the plunger 80 toward the drive disk 74.

A motive force cylinder 83 is provided, mounted on an upstanding wall 84 of the drive actuating mechanism housing 31. The cylinder 83 is provided with a piston 85 having a connecting rod or plunger 86 extending through the wall 84, with a connecting link 87 being disposed between the rod 86 and the radially outermost end of the drive lever 76. The drive lever is provided with a bore 88, (FIG. 3), in which is rotatably received a bearing member 90. The cylinder 83 is double-acting, i.e., it is provided with fluid inlet ports 91 and 92 on opposite sides of the piston 85, for driving the piston toward either end of the cylinder 83, and thereby providing either a clockwise or counter-clockwise motion for the drive shaft 54, which consequently results in either a forward or a reverse movement of the movable member 23, through the ball screw and ball nut connecting means.

The air inlet ports 91 and 92 of the cylinder 83 are connected, respectively, to fluid conduit lines 93 and 94, which are, in turn, connected to valves 95 and 96. The valves 95 and 96 are provided with respective inlet conduits 97 and 98, connected to a common conduit header 100. The header 100 receives pressurized air from a suitable source (not shown). Fluid is supplied to the cylinder 78 through a conduit 101 which is connected to a valve 102. The valve 102 has an inlet conduit 103 also connected to the header 100.

The valves 95, 96 and 102 are all substantially identical in construction, and therefore only valve 102 will be described in detail. The valve 102 comprises a casing 104 having a bore 105 extending longitudinally thereof, terminating in an end portion 106. A piston rod 107 is disposed within the bore 105, having three spaced pistons 108, 110, and 111 mounted on the piston rod 107 for longitudinal movement therewith. A blind bore 112 is provided in the end portion 104 in which a spring 113 is provided, for biasing the piston 111 outwardly, or leftward, as viewed in FIG. 3. A manually actuable button 114 is provided outwardly of the cylinder 102, connected to the rod 107, which may be frictionally movable within a bore in an end portion 115 of the cylinder 102, to maintain a selected position of the rod and pistons within the bore 105. The valve 102 is thus actuated when the rod 107 and its attached pistons 108, 110 and 111 are in the position illustrated in FIG. 3, positioned at their extreme rightward positions within the bore 105. In this position of the valve 102, air pressure through the inlet conduit 103 passes between the pistons 108 and 110, and outwardly of the valve 102 through the conduit 101, and to the cylinder 78.

When it is desired to de-actuate the valve 102, the button 114 is moved leftward, until the piston bottoms against the valve cylinder end wall 115, whereby air pressure from the inlet conduit 103 is blocked from entry into the bore 105 by the peripheral surface of the piston 110, and whereby the bore 105 between the pistons 110 and 111 is vented to atmosphere, through the vent 116. In this de-actuated position of the valve 102 (not shown) the cylinder 78 is also vented through the conduit 101, the bore 105, and the vent 116 of the valve 102.

As has been mentioned above, the operations of the valves 95 and 96 are generally similar to that of the valve 102, but it is to be noted that when one of the valves 95 and 96, is for example, in the position illustrated in FIG. 3 for valve 95, the other of the valves 95 and 96 is operative to provide venting from the low pressure side of the cylinder 83, as for example, in the position illustrated in FIG. 3 for valve 96, wherein low pressure air passes from the cylinder 83, through the conduit 94, and outwardly through the vent of the valve 96, thereby permitting the pressurized air passing through the conduit 93 from the valve 95 to drive the piston 85 toward the cylinder inlet port 92.

It is thus readily seen that motion for the drive lever 76 is provided in either direction by the double acting air cylinder 83. The angular motion of the lever 76 is imparted to the input shaft 54 through the clamping cylinder 78, by engagement of the plunger 80 with the drive disk 74.

Incremental input motion to the drive shaft 54 is thus accomplished by properly sequencing the air valves 95, 96 and 102. It is to be noted that these valves may be actuated and de-actuated manually, or automatically, as desired.

Figure 5:
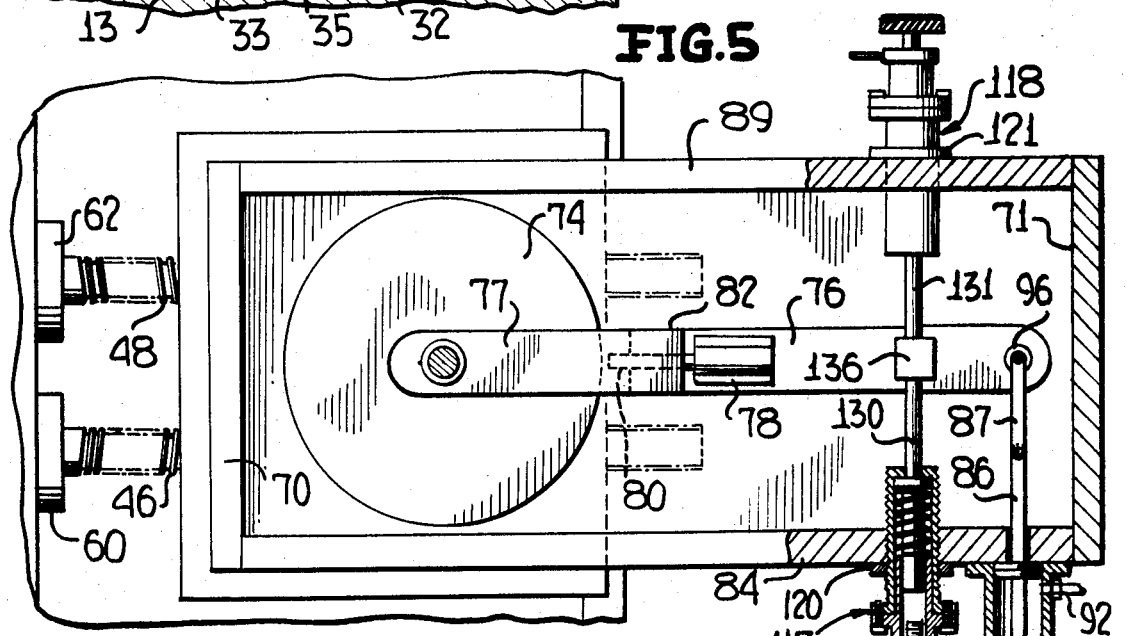
FIG. 5 is an enlarged fragmentary top view, taken generally along the line 5—5 of FIG. 4, and wherein means for providing opposite stops for the arcuate movement of the drive means is best illustrated, one of the stops being illustrated in section, for clarity.

With reference to FIGS. 3 and 5, it is seen that adjustable stop members 117 and 118 are provided, threadably engaged within upstanding sidewalls 84 and 89 respectively, and secured in position therein by suitable lock nuts 120 and 121.

Each of the stop members is identical in construction, and comprises a barrel portion 122, and a head portion 123. The barrel portion 122 has a threaded outer surface 124 and an inner bore 125. A pin 126 is disposed within the bore, having a collar 127 carried thereon, for abutment against an end wall 128 of the barrel 122. Pin extensions 130, 131 are provided for respective stop members 117 and 118. The stop member head portions 123 are threaded to each receive a stop screw 132, 133. A suitable locking device 134 is provided for each stop screw, to retain each stop screw in any given position. Each stop member 117, 118 is provided with a helical spring 135 disposed between the collar 127 and an inner end of the bore 125, to retain the collar 127 biased against the ends 128 of the barrel 122.

The stopping members 117 and 118 are combination centering and adjustable stop devices which control the angular motion of the drive lever 76. A stopping block 136 is mounted on the drive lever 76, for engagement by pins 130 and 131 of the respective stopping members 117 and 118. While the valves 95, 96 and 102 are in a de-actuated condition, and the incremental drive device is at rest, the drive link 76 is brought to a central position by the stopping members 117 and 118 being threaded into their respective housing walls 84 and 89, while the springs 135 are urging the respective pin members 130 and 131 in their extreme outward position, with the pins barely touching the stopping block 136. This establishes a center position for the drive lever 76, such that when the lever 76 is moved either clockwise or counter-clockwise away from this center position, the corresponding center pin 130 or 131 is depressed, compressing its associated spring 135 until the opposite end of the pin abuts against a stop screw, 132 or 133, respectively. The stop screws 132 and 133 may be adjusted to allow the lever 76 the desired angular movement in either direction, clockwise or counter-clockwise, away from the center position, one of the directions corresponding to forward movement of the screws 46 and 48, and the other direction of movement corresponding to reverse movement of the screws 46 and 48. It is readily seen that the stop screws 132 and 133 may be calibrated, if desired, for measuring the precise movement of the crank lever off of center, to precisely control the are through which the crank lever 76 is moved.

A desired incremental feed for the movable member 23 is achieved by properly sequencing the valves 95, 96 and 102, either manually or automatically, as desired. In order to obtain a forward increment of feed, the valve 102 would be actuated, in the position illustrated, to clamp the drive lever 76 to the drive disk 74 through the cylinder 78. The valve 96 would then be actuated to energize the cylinder 83 and to move the drive lever 76 through force transmitted through the connecting rod 86 and link 87 to the left, or in a clockwise direction as viewed in FIG. 3, until the centering pin 130 strikes the stop screw 132. The valve 102 is then de-actuated to release the clamping cylinder 78 and the valve 96 is de-actuated to allow the centering pin 130 to return the drive lever 76 to its original center position. In order to retain a reverse increment of motion, the sequence would involve actuating the valve 102 to operate the cylinder 78 to clamp the plunger 80 to the drive disk, followed by an actuation of the valve 95 to provide pressurized air into the left end of the cylinder 83, to move the drive lever 76 and centering pin 131 to the right, or in a counter-clockwise direction as viewed in FIG. 3. The valve 102 is then de-actuated to release the clamping force of the plunger 80 against the drive disk 74, and the valve 95 is then de-actuated to allow the drive lever 76 to return to its original center position.

The angular motion of the drive lever 76 may be limited to very small increments, such as a few minutes of a degree, by a relatively simple adjustment of the stop screws 132 and 133. This small angular motion is accurately transmitted to the drive disk 74 and drive shaft 54 and onto the pre-loaded gear train comprising the ball nuts and ball screws, resulting in very small increments of linear motion of the movable member 23, as transmitted through the ball screws 46 and 48. Also, the stop screws 132 and 133 may be readily re-adjusted to produce larger increments of feed when desired. A range of feed increments of 0.000005 inches to 0.001 inch may thus be quickly and easily attained.

Referring now to FIGS. 8 through 10, there is illustrated an alternative embodiment of an incremental feed device, generally designated by the numeral 140. This device embodies an actuation mechanism 141, disposed within a housing 142, generally similar in arrangement and operation to the means disposed within the housing 31, in the embodiment set forth above, for providing controlled incremental rotation or angular movement of the drive shaft 54. In the embodiment of FIGS. 8 through 10, the actuating device 141 provides angular movement for a drive shaft 143, disposed within a bore 144 of a housing 145. The housing 145 is also adapted to be mounted on a machine base 13, to provide transverse movement of a member 23 of the assembly 15 illustrated in FIGS. 1 and 2.

The housing 145 comprises an upper housing portion 146 and a lower housing portion 147. The bore 144 is provided in the upper housing portion 146. The shaft 143 is provided with journals 148, 149, 150 and 151, about which are disposed anti-friction means of the roller type 152, for centering the shaft 143 within the bore 144. The shaft 143 is provided with three spaced worms 153, 154 and 155. The worms 153 and 155 are disposed in the same direction, and the worm 154 is disposed in a direction opposite thereto.

The housing portion 147 is provided with three bores 156, 157 and 158, disposed with their longitudinal axes in a common horizontal plane. Three ball nuts 160, 161 and 162 are disposed respectively within the bores 156, 157 and 158. With reference to FIG. 9, the ball nut 160 is illustrated as being provided with a thrust bearing 163 at one end thereof, between the ball nut 160 and a reduced diameter portion 164 of the housing 147. At the opposite end of the ball nut 160, a thrust bearing 165 is provided against a shoulder 166 of the ball nut, constraining the ball nut between the housing portion 164 and a sleeve 167 disposed within the bore 156. Each sleeve 167 has an inner bore 168 in which is provided a pair of roller bearing assemblies 170 and 171, for radial alignment of the ball nut 160. The ball nuts 161 and 162 are similarly mounted within their respective bores.

The ball nuts 160, 161, and 162 are provided, respectively, with worm gearing toothed portions 172, 173 and 174. The worm 154 of the drive shaft 143 is disposed in driving engagement with the worm gearing 173 of the ball nut 161, for driving the ball nut 161 in a given direction. Likewise, the worms 153 and 155 of the drive shaft 143 are in driving engagement with the worm gearing 172 and 174 of the respective ball nuts 160 and 162, for driving the ball nuts 160 and 162 in directions of rotation opposite the direction of rotation of the ball nut 161.

The ball nuts 160, 161 and 162 are provided with respective ball screws 175, 176 and 177 which are driven all in the same longitudinal direction relative to their associated ball nuts, by anti-friction members 178 of the ball type. The ball nuts 160, 161 and 162 are also provided with ball return paths (not shown).

The ball screws 175, 176 and 177 are each provided with end flanges 178, 180 and 181, for securing the ball screws to a movable member 23. The ball screws are adapted to be pre-loaded, with the central ball screw loaded in opposition to the other ball screws 175 and 177. Thus, if the ball screw 176 is loaded in compression by rotating the flange 180 under a predetermined torque load, then tightened in its loaded position, an opposite tension pre-load is placed in each of the ball screws 175 and 177, between their operative connection to the drive shaft 143 and their respective mounting flanges 178 and 181. The tension pre-load in each of the ball screws 175 and 177 will be equal to one-half the compressive pre-load in the ball screw 176, so that the total tension pre-load equals the total compression pre-load. It is also to be noted that the particular construction of the driving arrangement between the worms mounted on the shaft 143 and the worm gears carried by the ball nuts provide a single motion reduction, and the ball nut and screw arrangements provide another motion reduction, whereby a double motion reduction is obtained between the drive shaft 143 and the movable member 23, as well as a transformation of rotary motion to linear motion.

From the foregoing, it will be seen that novel and advantageous provisions have been made for carrying out the desired end. However, attention is again directed to the fact that additional variations may be made in this invention without departing from the spirit and scope thereof as defined in the appended claims.

I claim:

1. In a feed device adapted for forward and reverse directional movement of a member, means for driving said member, means connecting said driving means to said member, means for preloading said member, said driving means and said connecting means to thereby eliminate backlash irrespective of the direction of drive of said member, said connecting means define at least two paths of force distribution between said driving means of said member, said preloading means being effective for placing elements of one of said paths in tension and for placing elements of another of said paths in compression.

2. An incremental feed device comprising a member adapted for forward and reverse movement, means for driving said member, at least two connection means between said driving means and said member, means oppositely preloading said connection means, said at least two connection means form a closed loop connection with said driving means and said member, and said preloading means preloads said entire closed loop connection.

3. The device of claim 2 wherein said connection means includes threaded elements, each connected to said member, and each connected to the drive means, to define at least one path of force transmission between said elements across at least a portion of said drive means, wherein one of said threaded members is in compression, and another is in tension.

4. The device of claim 2 wherein each connection means includes a screw and a ball nut of the anti-friction type.

5. The device of claim 4 wherein the drive means are provided with portions of the drive means being in driving engagement with corresponding portions on each said ball nut.

6. The device of claim 5 wherein said drive means comprise a shaft-like element mounted for rotation, and for linearly driving said member through said screws and ball nuts.

7. The device of claim 6 wherein said portions comprise worm gearing.

8. The device of claim 6 wherein the opposite preload of said connection means comprises at least one connection means being loaded in tension and another in compression through the drive means for eliminating backlash or play in the connection means.

9. The device of claim 8 wherein each said connection means comprises a means for effecting a double motion reduction.

10. The device of claim 8 wherein two of said screw and ball nut connection means are provided, with the shaft-like elements disposed therebetween.

11. The device of claim 8 wherein three of said screw and ball nut connection means are provided, one of said connection means being preloaded against the other two.

12. The device of claim 11 wherein said shaft-like drive element is disposed generally transverse to the axles of said screw and ball nuts, all of said screw and ball nuts being in a common plane.

13. The device of claim 8 wherein means are provided on one of said screws adjacent said member for preloading said screw and for concurrently transmitting a preloading force to said other screws through said drive means.

14. The device of claim 13 wherein said latter means includes a flange carried by said one screw, having an arcuate slotted hole therein for receiving a locking fastener therein, engageable in said member.

15. The device of claim 2 wherein said drive means comprise a shaft-like element mounted for rotation, and wherein the opposite preload of said connection means comprises at least one connection means being loaded in tension and another in compression through the drive means for eliminating backlash or play in the connection means, said connection means providing a motion reduction between said shaft-like element and said member.

16. The device of claim 15 wherein said connection means provides a double reduction.

17. The device of claim 15 wherein means are provided carried by said shaft-like element for manually rotating said drive means.

18. An incremental feed device adapted for forward and reverse movement of a member in response to movement of a drive means, said device including drive means and at least two connection means, said connection means being connected to the drive means and being adapted for connection to a member, said drive means comprising a shaft-like element mounted for rotation, said connection means providing a path for their opposite preloading, one in tension and the other in compression through the drive means for eliminating backlash in the connection means, said connection means comprising a motion reducing means, and wherein means are provided for obtaining a precise predetermined forward or reverse movement of a member by rotational movement of said shaft-like element through a predetermined arc.

19. The device of claim 18 wherein said latter means include a disk element fixedly carried by said shaft-like element and a plunger element positively engageable with a peripheral portion of said disk element, including means for arcuately moving said plunger element about the axis of said shaft-like element.

20. The device of claim 19 wherein said plunger element is frictionally engageable with said disk element peripheral portion.

21. The device of claim 19 wherein said arcuate moving means comprises a generally radial drive lever having one end disposed generally concentric with the axis of said shaft-like element, the other end being provided with motive force means.

22. The device of claim 21 wherein said plunger element is provided with motive force means and each said motive force means includes a pressure cylinder.

23. The device of claim 22 wherein the pressure cylinder which comprises said drive lever motive force means is double acting for said forward and reverse movement.

24. The device of claim 23 wherein valve means are provided for said pressure cylinders for selectively operating said plunger pressure cylinder during energizing of either side of said double-acting cylinder.

25. The device of claim 21 wherein combination stop and centering means are provided for limiting the arcuate movement of said drive lever.

26. The device of claim 25 wherein adjustment means are provided for said combination stop and centering means, for pre-setting a desired angular movement of said drive lever from an initial center position.

27. The device of claim 25 wherein said combination stop and centering means comprise two separate stop devices, one disposed on each side of said drive lever.

28. In a feed device adapted for forward and reverse directional movement of a member, means for driving said member, means connecting said driving means to said member, means for preloading said member, said driving means and said connecting means to thereby eliminate backlash irrespective of the direction of drive of said member, said connecting means define at least two spaced parallel paths of force distribution between said driving means and said member, and said preloading means being effective for placing elements of one of said paths in tension and for placing elements of another of said paths in compression.

29. The device of claim 28 wherein said connecting means includes a pair of screws each connected to said member and at least in part defining one of said spaced parallel paths of force distribution, and each threaded element being connected to said driving means.

30. The device of claim 29 wherein each screw is coupled to said driving means by an associated nut.

31. The device of claim 30 including means common to said nuts for rotating the same while axially and contemporaneously achieving tensile and compressing preloading.

* * * * *